United States Patent [19]

Baatz et al.

[11] 4,315,996

[45] Feb. 16, 1982

[54] METHOD FOR THE MANUFACTURE OF COMPOSITE FOAM MATERIALS

[75] Inventors: Günther Baatz, Buxheim; Klaus-Dieter Conrad; Franz Riemhofer, both of Memmingen, all of Fed. Rep. of Germany

[73] Assignee: Metzeler Schaum GmbH, Memmingen, Fed. Rep. of Germany

[21] Appl. No.: 212,800

[22] Filed: Dec. 4, 1980

[30] Foreign Application Priority Data

Dec. 7, 1979 [DE] Fed. Rep. of Germany ....... 2949392

[51] Int. Cl.³ ............................................ C08G 18/14
[52] U.S. Cl. ....................................................... 521/54
[58] Field of Search .......................................... 521/54

[56] References Cited

U.S. PATENT DOCUMENTS

| | | | |
|---|---|---|---|
| 3,114,722 | 12/1963 | Einhorn et al. | 521/54 |
| 3,717,597 | 2/1973 | Hesskamp et al. | 521/54 |
| 4,082,703 | 4/1978 | Duffy et al. | 521/54 |
| 4,260,688 | 4/1981 | Simon | 521/54 |

*Primary Examiner*—Maurice J. Welsh
*Attorney, Agent, or Firm*—Herbert L. Lerner; Laurence A. Greenberg

[57] ABSTRACT

Method for manufacturing composite foam articles from foam material flakes, polyurethane binders and additional solid components which cause a modification or change of the properties of foam material by mixing and hardening the mixture under pressure. The additional solid components are admixed in the form of an aqueous dispersion and/or aqueous solution thereby introducing and admixing them without difficulty and permitting the manufacture of composite foam materials with different properties as required.

15 Claims, No Drawings

METHOD FOR THE MANUFACTURE OF COMPOSITE FOAM MATERIALS

BACKGROUND OF THE INVENTION

1. Field of the Invention

The invention relates to a method for the manufacture of composite foam materials of foam-material flakes, polyurethane binders and additional solid components which cause a modification or change of the properties of the composite foam material.

2. Description of the Prior Art

In a known method for the manufacture of composite foam materials, flakes of foam-material remnants, as a rule of soft elastic polyurethane foam materials, are mixed with binders which are likewise based on polyurethane raw materials and are joined together under pressure and optionally heat. In general one works here with isocyanate group-containing prepolymers as binders and the hardening is crried out by means of hot steam which serves as the heat carrier and at the same time as a cross-linking agent for the prepolymer.

While the properties of the composite foam materials obtained in this manner are adequate for a number of rather secondary applications, they do not allow in many cases the use of these products because, for instance, the elongation breaking point or tensile strength is too low. Also the appearance of such composite foam materials which are as a rule produced from random mixtures of flakes of foam materials with different colors leaves much to be desired and is improved in many cases by the addition of fairly large quantities of expensive pigment pastes to the binder. Therefore, simple and cost-effective methods are needed which impart to the composite foam materials so produced a uniform appearance.

From German Published Prosecuted Application No. 16 29 666 it is known that webs of non-thermoplastic foam materials can be given thermoplastic properties, i.e. can be made deformable and weldable by bringing small particles, i.e. flakes of the non-thermoplastic foam material mixed with thermoplastic plastic material into the form of a web, then densifying them by subjecting them to pressure and heat and then cooling them. To obtain good deformation and welding properties, however, relatively large quantities of the thermoplastic material with which the flakes are impregnated are required. It has been found that such composite materials are not sufficiently heat-resistant, since the charged-in foam material flakes revert under the influence of higher temperatures and thereby lead to dimensional changes or even to a decomposition of the composite web.

From U.S. Pat. No. 3,114,722, a method for the manufacture of composite foam materials is known in which the foam material flakes are first mixed with dispersions or solutions of a catalyst and subsequently with a prepolymer.

Methods for manufacturing composite foam materials from foam material flakes, polyurethane binders and additional solid components are known from U.S. Pat. No. 3,717,597 as well as from the report on the Japanese Patent Application No. 117,766/1975, reported in the CPI-Profit Booklet 1977, Report 89734 X/48. There, solid components are used which cause a modification or change of the properties of the composite foam materials. In this method, the foam material flakes are mixed with a binder which forms polyurethane, and with the additional solid components. The foam material flakes are cemented together by subsequent hardening of the mixture so obtained under pressure and, optionally heat.

In the known manufacturing methods for composite foam materials, the properties of the end products and therefore of the composite foam materials, are imparted essentially by the type of foam material flakes and the binder used. A modification or change of these properties is possible only at relatively large expense, since the additional solid components must generally be brought into the mixture of foam material flakes and the polyurethane binders by mechanical means and must be mixed homogeneously so that the composite foam materials produced therefrom have homogeneous and uniform properties throughout their entire volume.

SUMMARY OF THE INVENTION

It is, therefore, an object of the invention to provide a method for manufacturing composite foam materials from foam material flakes, polyurethane binders and additional solid components, in which introducing the additional solid components presents no difficulties and, therefore, composite foam materials with different properties can be manufactured as required.

With the foregoing and other objects in view, there is provided in accordance with the invention a method for the manufacture of composite foam materials of foam material flakes, polyurethane binders and additional solid components which cause a modification or change of the properties of the composite foam material by mixing the foam material flakes with a polyurethane-forming binder and the additional solid components and cementing the foam material flakes together by subsequent hardening of the mixture obtained under pressure, the improvement comprising admixing said additional solid components in the form of an aqueous dispersion or an aqueous solution.

Other features which are considered as characteristic for the invention are set forth in the appended claims.

Although the invention is illustrated and described herein as embodied in a method for the manufacture of composite foam materials, it is nevertheless not intended to be limited to the details shown, since various modifications may be made therein without departing from the spirit of the invention and within the scope and range of equivalents of the claims.

The invention, however, together with additional objects and advantages thereof will be best understood from the following description.

DETAILED DESCRIPTION OF THE INVENTION

The advantages obtained with the invention are in particular that the additional solid components present in the form of an aqueous dispersion and/or an aqueous solution can be mixed homogeneously with the other components in a simple manner, so that overall a very uniform mixture and, thereby, composite foam materials with very uniform properties are obtained. Large operating costs are, therefore, not required for the manufacture of the mixture to be hardened. In addition, many solid components which give desirable properties to the composite foam materials can be prepared in the form of an aqueous dispersion and/or an aqueous solution, so that composite foam materials with a corresponding multiplicity of properties can be produced.

As particularly desirable properties, the possibility of thermal deformation or high-frequency welding, the improvement of the burning behavior, the lowering of the surface and bulk resistance or the achievement of microbistatic or microbicidic action shall be mentioned.

Examples of aqueous dispersions and/or aqueous solutions are those which contain Pigments
Dyes
Carbon black Flame protection agents such as phosphates, for instance, ammonium polyphosphate or halogenized alkylphosphates, melamine, dicyandiamide, ammeline, guanidine chloride, thiourea, aluminum oxide hydrate, etc. and their combinations.

Polymers such as homo and/or copolymerisates of, for example,

Vinyl acetate
Vinyl chloride
Vinylidene chloride
Styrene
Butadiene
Acrylonitrile Acrylic acid, its esters, acid amides or acid amide derivates, methyl-acrylic acid, its esters, acid amides or acid amide derivatives Ethylene Propylene or poly-addition products such as, for instance, polyurethanes Microbicide or microbistatic agents or other additives or auxiliary substances.

If aqueous polymer dispersions and/or polymer solutions are used, those are preferred in which the film-forming temperature of the polymer is below 70° C. and preferably under 30° C. The proper polymers can be selected rather easily on the basis of the properties of the composite foam materials to be manufactured as desired in each case by a few preliminary tests. The same applies to determining the quantities of aqueous dispersion and/or solution to be used in each case.

The amounts of aqueous dispersion and/or aqueous solution which are to be used can be varied appreciably depending on the properties desired in the product, and is 0.5 to 100 parts by weight per 100 parts by weight of foam material flakes. Preferably 10 to 30 parts by weight polyurethane-forming binder and 0.5 to 50, desirably 1 to 30, parts by weight aqueous dispersion and/or aqueous solution are used per 100 parts by weight of foam material flakes. In a preferred operation the full reaction of the mixture of foam material flakes, polyurethane-forming binder and aqueous dispersion and/or aqueous solution is carried out at a pressure of at least 1K Pa. Elevated temperatures above 80° C., preferably between 100° and 150° C., are preferably employed when carrying out the full reaction of the mixture of foam material flakes, polyurethane-forming binder and aqueous dispersion and/or aqueous solution. In a preferred embodiment the full reaction of the mixture of foam material flakes, polyurethane-forming binder and aqueous dispersion and/or aqueous solution is carried out in the presence of steam.

The following are of interest as polyurethane binders: Mixtures of polyhydroxy alcohols and polyisocyanates, where the amount of polyisocyanate in this mixture is the amount equivalent to the polyhydroxy alcohol or more, preferably 1.5 to 6 times, and particularly 2 to 4-times the amount of polyisocyanate equivalent to the polyhydroxy alcohol.

Isocyanate groups containing prepolymers of polyhydroxy alcohols and polyisocyanates are preferred, where an excess of polyisocyanate 1.5 to 6-times and preferably 2 to 4-times over the polyhydroxy alcohol equivalent polyisocyanate was used.

The type of polyurethane binder and its amount depends on the application of the composite foam material produced according to the invention and can be determined quickly by a few preliminary tests. If flakes of soft elastic polyurethane foam materials are used, 2 to 4 hydroxyl groups-containing polyethers with a molecular weight between 1000 and 10,000 and particularly between 1500 and 6000 are preferred as polyhydroxy alcohols of the polyurethane binder. As polyisocyanate of the polyurethane binder, all known isocyanates which are usable for producing polyurethane foam materials, in particular 2.4 and/or 2.6 toluylene diisocyanate (particularly its technical isomer mixtures with 65 or 80% by weight of the 2.4 isomer).

For the manufacture of the compound foam materials according to the invention, the foam material flakes can either be mixed first with a polyurethane binder and subsequently with an aqueous dispersion and/or aqueous solution or first, with an aqueous dispersion and/or aqueous solution and then with a polyurethane binder. The mixtures so obtained are then hardened in known manner.

If aqueous dispersion and/or solutions of pigments, dyes, carbon black, microbicide or other additives or auxiliary substances are used, it has been found practical to mix the foam material flakes first with the polyurethane binder and then with the aqueous dispersions and/or solutions of the substances mentioned. Thereby, the effective components of the dispersions and/or solutions are at the surface of the individual flakes and their effect thus develops optimally.

If aqueous polymer dispersions and/or aqueous polymer solutions are used, the sequence of adding the polyurethane binders and the aqueous dispersions and/or solutions depends on the properties of the polymers used.

If aqueous dispersions and/or solutions of polymers are used which form a film only with difficulty or only at high temperatures, it is advisable to admix the polyurethane binder first and then the dispersion and/or solution of the polymer to the foam material flakes. Thereby, composite foam materials can be manufactured, for instance, according to the invention, which are sufficiently strong and temperature-resistant for a number of applications as well as weldable, for instance by heat or by high-frequency energy.

The reverse sequence of adding, first, aqueous polymer dispersion and/or aqueous polymer solution and then the polyurethane binder to the foam material flakes is recommended particularly if polymers are used which, while having excellent adhesion to the foam material flakes, result alone in insufficient strength and temperature resistance of the composite foam material. Through the combination according to the invention, of aqueous dispersion and/or solution of such polymers with a polyurethane binder, composite foam materials are obtained which exhibit considerably improved properties, for instance higher elongation breaking point and higher tensile strengths as compared to the known composite foam materials which are made only with polyurethane binders.

The composite foam materials manufactured according to the invention can be applied in many fields, for instance as damping material in the packaging industry or in the automobile industry.

The following examples further illustrate the present invention; all parts are parts by weight.

EXAMPLE 1

In a mixture of the type FM 300 D of the firm Lödige, Paderborn, 1.4 kg polyurethane soft foam flakes are prepared by comminuting polyurethane soft foam remnant and sifting through a sieve with 10 mm mesh width (10 mm flake). The mixer is then set to 140 rpm (revolutions per minute) at the mixer shaft. Then, 15 parts of a 53% aqueous dispersion of a copolymerisate of vinyl acetate and ethylene is added per 100 parts of flakes (Vinnapas LT 441 of Wacker Chemie GmbH, 8000 München 22). The total amount of dispersion is added within a minute.

Subsequently, mixing is continued for 5 minutes under the above-mentioned condition. After this mixing phase, 7.5 parts of a prepolymer are added per 100 parts of flakes under the same addition and mixing conditions. The prepolymer was prepared by reaction of a branched polyether of Bayer AG (Desmophene 3900, OH-number 35±2, average molecular weight 4800±300) with a mixture of 80% toluylene-2,4 diisocyanate with 20% toluylene-2,6-diisocyanate (Desmodure T 80 of Bayer AG). In preparing the prepolymer, 100 parts Desmophene 3900 are mixed with 20.6 parts Descmodure T 80 while stirring.

The NCO-value is about 6.5% after 24 hours. The flakes containing binder are then placed in a metal mold with a base area of 40×40 cm. The mold lid is locked at a distance of 9 cm from the bottom of the mold. Thereby, the flakes are compressed, and by heating in a circulating air drying cabinet at 140° C. for 2 hours, a molded body with the above-mentioned dimensions is produced.

In this process, the outer phase is removed from the polymer dispersion for forming the film, and at the same time the water vapor produced takes care of the hardening of the prepolymer.

The lid and bottom of the mold are perforated in order to allow the evaporation of excess water. In a similar manner, it is possible to blow hot air of 140° to 160° C. through a suitably constructed mold of the above-mentioned dimensions by means of a variable-speed blower and to thereby carry out the same reaction as in the circulating air drying cabinet but within 15 minutes.

The resulting composite foam has the following properties:
Bulk density: 120 kg/m$^3$
Tensile strength: 71 KPa
Elongation breaking point: 84%
Crushing hardness with 40% deformation: 17.6 KPa Slabs of the composite foam 10 mm thick could be welded without trouble with a high-frequency welding generator of the firm Kiefel-Körting of the type G 2000 sb (operating frequency 27.12 megahertz) (at 2.5 KV plate current 0.45 A, welding time 2 seconds).

EXAMPLE 2

Under the conditions of Example 1, 7.5 parts of the prepolymer described under Example 1 are admixed per 100 parts of flakes to 1.4 kg 10 mm polyurethane soft foam flakes and subsequently, under the same mixing conditions, 15 parts of the aqueous 55% dispersion of a vinylidene chloride mixed polymersate of BASF was added per 100 parts of flakes (Diofan 193D).

Composite foam prepared by means of hot air (15 minutes, approximately 150° C.) as described under Example 1, has the following properties:
Raw density: 125 kg/m$^3$
Tensile strength: 45 KPa
Elongation breaking point: 52%
Crushing hardness for 40% deformation: 18.9 KPa
High-frequency welding test; weldable without problem (at 2.5 KV, plate current 0.46 A, welding time 2.8 sec.).

EXAMPLE 3

As described in Example 1, a 40% aqueous aliphatic polyester urethane dispersion (Impranil DLH of Bayer AG) is mixed with 1.4 kg 10 mm-polyurethane soft foam flakes in the proportion of 18.5 parts dispersion per 100 parts of flakes.

As the second binder component, the prepolymer mentioned in Example 1, is admixed under the conditions of that example in the ratio of 7.5 parts per prepolymer to 100 parts of flakes.

The composite foam produced by heating for 2 hours in the drying cabinet in the metal mold described in Example 1 has the following properties:
Bulk density: 113 kg/m$^3$
Tensile strength: 86 KPa
Elongation breaking point: 97%
Crushing hardness for 40% deformation: 17.6 KPa
High-frequency welding test has as described in Example 1: perfectly weldable (at 2.5 K, plate current 0.4 A, welding time 2.5 sec.).

EXAMPLE 4a

In order to produce a composite foam with increased surface conductivity, the prepolymer described in Example 1 is added under the mixing conditions described there as a binder to 1.4 kg 6 mm-polyurethane soft foam flakes in the ratio of 15 parts prepolymer to 100 parts flakes.

After an adding and mixing time of 6 minutes total, 30 parts of a 25% aqueous carbon black dispersion are added per 100 parts of flakes (AN 1-25/L of the firm Degussa, Hanau) and are distributed during another 5 minutes mixing time uniformly over the surface of the flakes.

For hardening the prepolymer, more water can be admixed to the water present in the system due to the carbon black dispersion. The setting reaction is carried out under the conditions described in Example 1. The resulting composite foam has the following properties:
Bulk density: 118 kg/m$^3$
Tensile strength: 75 KPa
Elongation breaking point: 55%
Crushing hardness: 30.2 KPa for 40% deformation
Surface resistance, (following DIN 53482) $1.6 \cdot 10^4$ ohm.

EXAMPLE 4b

The process is similar to Example 4a with the change that 40 parts carbon black dispersion are used per 100 parts of flakes which gives the following properties in the composite foam:
Bulk density: 124 kg/m$^3$
Tensile strength: 96 KPa
Elongation breaking point: 53%
Crushing hardness for 40% deformation 30.8 KPa Surface resistance (following DIN 54482) $1.5 \cdot 10^3$ ohm.

We claim:

1. Method for the manufacture of composite foam materials of foam material flakes, polyurethane binders and additional solid components which cause a modification or change of the properties of the composite foam material by mixing the foam material flakes with a polyurethane-forming binder and the additional solid components and cementing the foam material flakes together by subsequent hardening of the mixture obtained under pressure, the improvement comprising admixing said additional solid components in the form of an aqueous dispersion or an aqueous solution.

2. Method according to claim 1, wherein said subsequent hardening is facilitated by the application of heat.

3. Method according to claim 1, wherein the foam material flakes are first mixed with said polyurethane-forming binder and subsequently with said aqueous dispersion or aqueous solution containing pigments, dyes, carbon black and microbicide.

4. Method according to claim 1, wherein said foam material flakes are first mixed with said polyurethane-forming binder and subsequently with said aqueous dispersion or aqueous solution of a polymer which forms a film only with difficulty or only at high temperatures.

5. Method according to claim 1, wherein said foam material flakes are first mixed with said aqueous dispersion or aqueous solution of a polymer which alone results in insufficient strength and temperature resistance of the composite foam material, and thereafter with said polyurethane-forming binder.

6. Method according to claim 1, wherein said polyurethane-forming binder is a prepolymer of a polyhydroxy alcohol and an excess of polyisocyanate.

7. Method according to claim 1, wherein said aqueous dispersion or aqueous solution is used in an amount of 0.5 to 100 parts by weight per 100 parts by weight of foam material flakes.

8. Method according to claim 6, wherein said aqueous dispersion or aqueous solution is used in an amount of 0.5 to 100 parts by weight per 100 parts by weight of foam material flakes.

9. Method according to claim 6, wherein 10 to 30 parts by weight polyurethane-forming binder and 0.5 to 50 parts by weight aqueous dispersion or aqueous solution are used per 100 parts by weight of foam material flakes.

10. Method according to claim 1, wherein 10 to 30 parts by weight polyurethane-forming binder and 0.5 to 50 parts by weight aqueous dispersion or aqueous solution are used per 100 parts by weight of foam material flakes.

11. Method according to claim 1, wherein said mixture of foam material flakes, polyurethane-forming binder and aqueous dispersion or aqueous solution is reacted at a pressure of at least 1 KPa.

12. Method according to claim 9, wherein said mixture of foam material flakes, polyurethane-forming binder and aqueous dispersion or aqueous solution is reacted at a pressure of at least 1 KPa.

13. Method according to claim 11, wherein said mixture of foam material flakes, polyurethane-forming binder and aqueous dispersion or aqueous solution is reacted at temperatures above 80° C.

14. Method according to claim 11, wherein said mixture of foam material flakes, polyurethane-forming binder and aqueous dispersion or aqueous solution is reacted at temperatures between 100° and 150° C.

15. Method according to claim 1, or claim 12, or claim 13, wherein said mixture of foam material flakes, polyurethane-forming binder and aqueous dispersion or aqueous solution is reacted in the presence of steam.

* * * * *